United States Patent [19]

Lew

[11] 4,441,858

[45] * Apr. 10, 1984

[54] VARIABLE CAMBER FLUID POWER MACHINE

[76] Inventor: Hyok S. Lew, 7890 Oak St., Arvada, Colo. 80005

[ * ] Notice: The portion of the term of this patent subsequent to Sep. 1, 1998 has been disclaimed.

[21] Appl. No.: 236,207

[22] Filed: Feb. 20, 1981

Related U.S. Application Data

[63] Continuation-in-part of Ser. No. 63,141, Aug. 2, 1979, Pat. No. 4,286,922.

[51] Int. Cl.³ .............................................. F03D 3/06
[52] U.S. Cl. ......................................... 416/17; 416/24
[58] Field of Search ............... 416/17, 23, 24, DIG. 5, 416/DIG. 6

[56] References Cited

U.S. PATENT DOCUMENTS 3,295,827  1/1967  Chapman et al. .................... 416/159
4,178,126 12/1979  Weed .................................... 416/17

FOREIGN PATENT DOCUMENTS 1028626  3/1978  Canada ................................. 416/17
 482607 12/1922  Fed. Rep. of Germany ........ 416/23
 915892 11/1946  France ................................. 416/17

Primary Examiner—Harvey C. Hornsby
Assistant Examiner—Christine A. Peterson

[57] ABSTRACT

This invention relates to a device converting the kinetic energy belonging to the moving stream of the fluid such as the wind, river and gulf streams to the power capable of doing a useful work in the form of a rotational motion with torque. Said device comprises two or more blades revolving about the central axis, which blades are made to rotate about its own axis parallel to the central axis at an angular velocity equal to one half of that of the revolving motion of the blades about the central axis. A pair of flaps are pivotably disposed at both edges of each of the blades, the deflection of which flaps is linked to the rotational motion of the blades that is in turn linked to the revolving motion of the blades in such a way that the blade and flaps line up to the direction of the fluid motion at the minimum drag position in the revolving motion while said combination takes up a position of the maximum drag position, which is a line up perpendicular to the direction of the fluid motion, at another position in the revolving motion of the blade diametrically opposite to the minimum drag position. The flaps are deflected to generate a lift force resulting in the additional torque when the blades are positioned intermediate the minimum and the maximum drag positions. Said device may be called SAIL-MILL when applied as a wind mill wherein an automatic means for positioning said two extreme drag positions appropriately with respect to the wind direction is included.

4 Claims, 6 Drawing Figures

VARIABLE CAMBER FLUID POWER MACHINE

The present patent application is a continuation-in-part of a patent application entitled VARIABLE CAMBER FLUID POWER MACHINE filed by this inventor on Aug. 2, 1979 to which a Ser. No. 063,141 was asigned now U.S. Pat. No. 4,286,922.

The present invention relates to a device converting the kinetic energy belonging to the moving fluid streams such as the wind, river, gulf stream and ocean thermal currents to a usable mechanical energy in the form of a rotating motion with a torque capable of doing useful work.

The primary object of the present invention is to provide a fluid power machine utilizing the drag force as well as the lift force on the blades in creating the rotating motion with a torque.

Another object of the present invention is to maximize the lift force on the blades of the fluid power machine by providing a pair of flaps disposed on each edge of the blade which varies the camber of the blades.

A further object of the present invention is to provide a fluid power machine generating the greatest possible power for its bulk and weight.

Yet another object of the present invention is to provide a fluid power machine requiring the minimum structural strength in its structure.

Still a further object of the present invention is to provide a fluid power machine which is inexpensive and easy to install, operate and maintain.

These and other objects of the present invention will become clear as the description of the present invention proceeds. The present invention may be described with a great clarity and specificity by referring to FIGS. 1, 2, 3, 4, 5 and 6.

Figure 1:
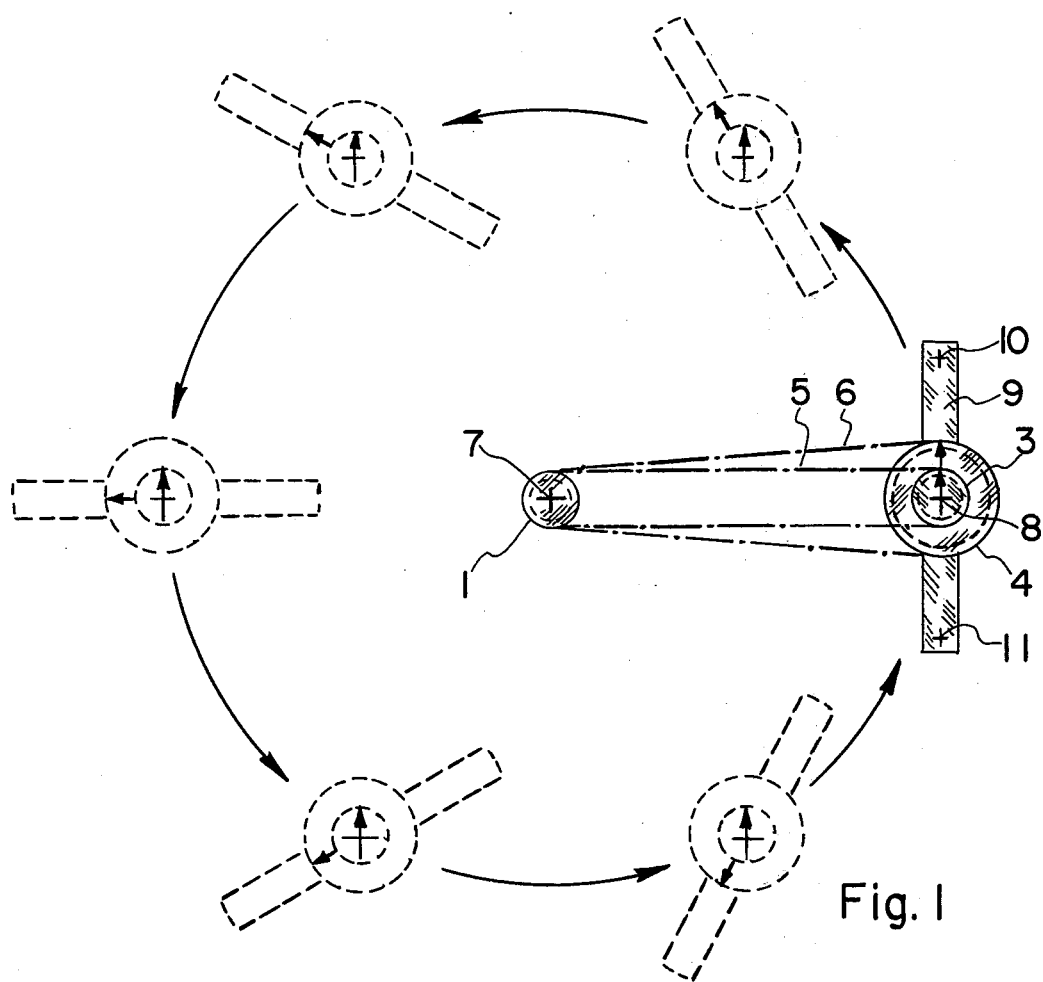
FIG. 1 illustrates a plan view of the arrangement of the blades less the flaps in a fluid power machine.
Figure 2:
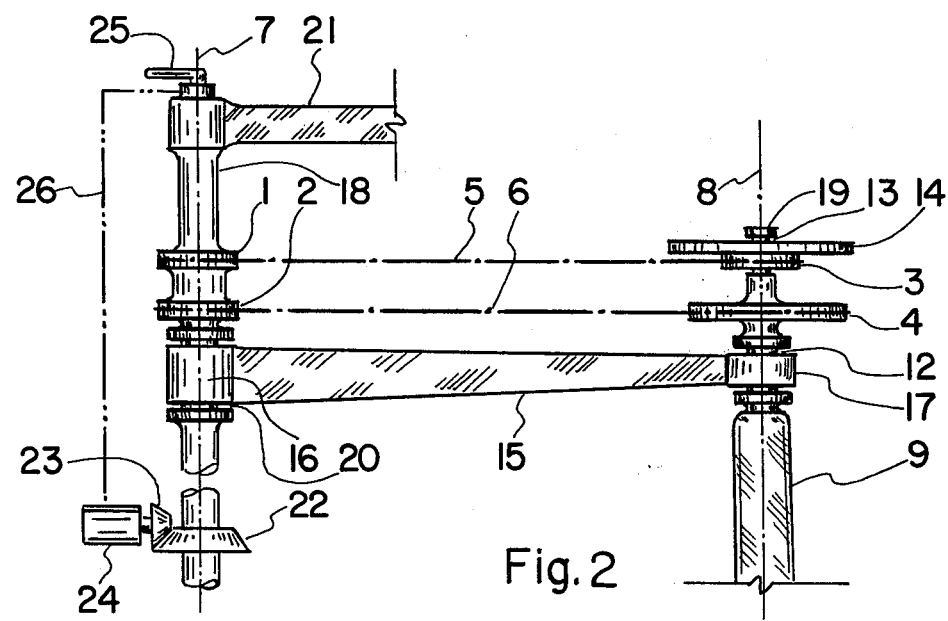
FIG. 2 illustrates an elevation view showing the mechanical links between the central shaft and the blade assembly of the fluid power machine shown in FIG. 1.

In FIGS. 1 and 2, there is shown an arrangement of a blade less flaps employed in a fluid power machine constructed in accordance with the priciples of the present invention, wherein the blade less flap drawn in the real lines show the blade less flaps located at the minimum drag position which is the 3 o'clock position in the embodiment shown in FIG. 1. The maximum drag position is located at the position diametrically opposite to the minimum drag position, which is obviously the 9 o'clock position. The first central sprocket or gear 1 is located at the central axis 7 of the fluid power machine. The blade 9 which is disposed rotatably about its own axis 8 at the outer extremity of an arm 15 rotatable about the central shaft 18, revolves about the central axis 7 driven by the force on the blades like blade 9 axisymmetrically disposed about the central axis 7, which forces are created by the fluid stream moving from the 12 o'clock direction to the 6 o'clock direction. The blade sprocket or gear 4 is rigidly connected to the blade 9 and linked to the first central sprocket or gear 1 by means of a roller chain or other mechanical transmission means 6 wherein the blade sprocket or gear 4 has twice as many teeth as those of the first central sprocket or gear 1. The flap sprocket of gear 3 is rotatably disposed about the blade axis 8 and linked to the second central sprocket or gear 2 by means of the roller chain or other mechanical transmission means 5 wherein the flap sprocket or gear 3 has the same number of teeth as the second central sprocket or gear 2. It should be understood that the specific size of the sprockets or gears employed in the embodiment shown in FIGS. 1 and 2 is to facilitate the explanation of the operating principles of the present invention. However, said combination of teeths are not mandatorily required as long as the final result on the inter-linking of movements of the blade and the flaps to one another is accomplished.

In FIG. 2, there is shown the upper portion of a blade assembly linked to the central shaft of the fluid power machine shown in FIG. 1. The arm 15 has a bearing 17 at one extremity rotatably engaging a journal 12 disposed on the blade shaft 19 rigidly connected to the blade 9 coaxially to the blade axis 8. Another bearing 16 disposed at the other extremity of the arm 15 engages rotatably the journal 20 disposed on the central shaft 18. The first and second central sprockets or gears 1 and 2 are nonrotatably disposed on the central shaft 18. The blade sprocket or gear 4 is nonrotatably disposed to the blade shaft 19 while the flap sprocket or gear 3 is rotatably disposed on a journal 13 built on the blade shaft 19. The wheel or sprocket or gear 14 is rigidly and coaxially connected to the flap sprocket or gear 3. The central shaft may further comprise a rudder arm 21 to which a rudder or drag chute may be attached, or wind direction sensor 25, transmitter 26 and the servomotor 24 which rotates the central shaft 18 by means of a pair of bevel gears 22 and 23. The object of the rudder or drag chute attached to the rudder arm 21 as well as the combination of the wind direction sensor 25-servomotor 24 is to rotate the central shaft 18 in conjunction with the shifting wind direction in order to maintain the diametrical plane including the maximum and minimum drag positions at an orientation perpendicular to the wind direction. Of course, in an application to the river stream where the direction of the flow remains constant, said means for orienting the diametrical plane with respect to the flow direction is not required.

With the arrangements of the first and second central sprockets or gears 1 and 2, and the blade and flap sprockets or gears 4 and 3 as shown in FIGS. 1 and 2, the blade sprocket or gear 4 rotates 180 degrees about the blade axis 8 when the blade 9 completes 360 degree revolution about the central axis 7 relative to the central shaft 18, while the flap sprocket or gear 3 experience no rotation at all. As a consequence, the blade 9 experience 180 degree rotation about the blade axis 8 per 360 degree revolution of said blade about the central shaft 18, and the flap sprocket or gear 3 undergoes 180 degree rotation about the blade axis 8 relative to the blade 9 per 360 degree revolution of the blade 9 about the central shaft 18 as illustrated in FIG. 1.

Figure 3:
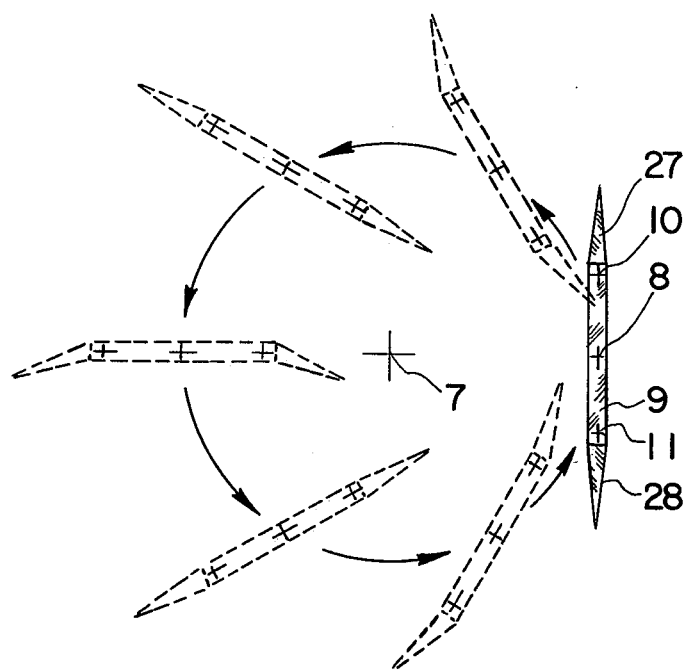
FIG. 3 illustrates a plan view of the arrangement of the blade-flap assembly showing its orientation and camber at various positions in the revolution about the central axis of the fluid power machine.
Figure 4:
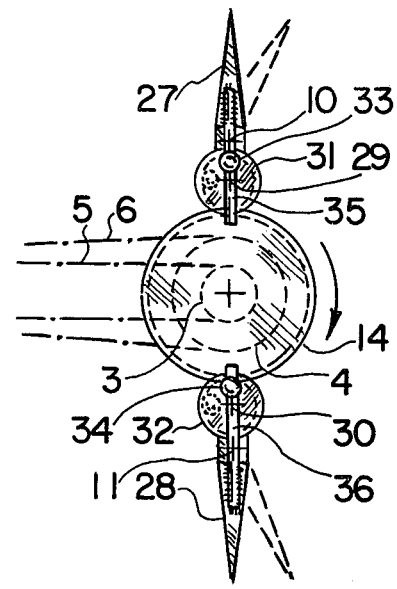
FIG. 4 illustrates a mechanism for linking the pivoting motion of the flaps to the rotating motion of the blade about its own axis that results in the arrangement shown in FIG. 3.

In FIGS. 3 and 4, there is illustrated a blade-flap assembly wherein a pair of flaps 27 and 28 are disposed at each edge of the blade 9 pivotably about the flap axis 10 and 11, respectively. A first actuator gear or sprocket 31 is rotatably disposed about an axis 29 located intermediate the blade axis 8 and the first flap axis 10, which actuator gear or sprocket 31 is linked to the wheel or sprocket or gear 14 rigidly and coaxially connected to the flap sprocket or gear 3, wherein the actuator gear or sprocket 31 has teeth equal to one third of those of the wheel or sprocket or gear 14 in number. Since the flap sprocket or gear 3 undergoes 180 degree rotation relative to the blade 9 per 360 degree revolution of the blade 9 about the central shaft 18, the first actuator gear or sprocket 31 experiences 540 degree rotation relative to the blade 9 per 360 degree revolution of the blade 9 about the central shaft 18. A slide bearing 33 is eccentrically and rotatably disposed on the face of the first actuator gear or sprocket 31, which slide bearing 33 engages a rod 35 extending from the flap 27 in a sliding relationship. The second actuator gear or sprocket 32 including a eccentric rotatable slide bearing 34 slidably engaging a rod 36 extending from the flap 28 is disposed rotatably about an axis 30 located intermediate the blade axis 8 and the flap axis 11, wherein the same number of teeth are employed for the actuator gear or sprocket 32 as for the actuator gear or sprocket 31. As the actuator gears or sprockets 31 and 32 are rotated by the wheel or sprocket or gear 14, the flaps 27 and 28 become deflected back and forth as illustrated in the broken lines in FIG. 4. Since the flap actuator gears or sprockets 31 and 32 undergo 540 degree rotation relative to the blade 9 per 360 degree revolution of the blade 9 about the central shaft 18, the maximum deflection of the flaps 27 and 28 takes place at three different positions, which are approximately 60, 180 and 300 degree revolution angles as shown in FIG. 3. It should be understood that the maximum deflection of the flaps or the maximum camber may actually takes place at the revolution angles equal to or somewhat less than or somewhat greater than those three angles mentioned above depending on the distance between the flap axis and the center of the actuator gear or sprocket in comparison with the eccentric distance of the slide bearing engaging the rod extending from the flap. It is not difficult to appreciate what an additional torque can be generated by the fluid power machine of variable camber blades because of the increased lift force created by the greater camber of the blades intermediate two extreme drag positions as illustrated in FIG. 3.

Figure 5:
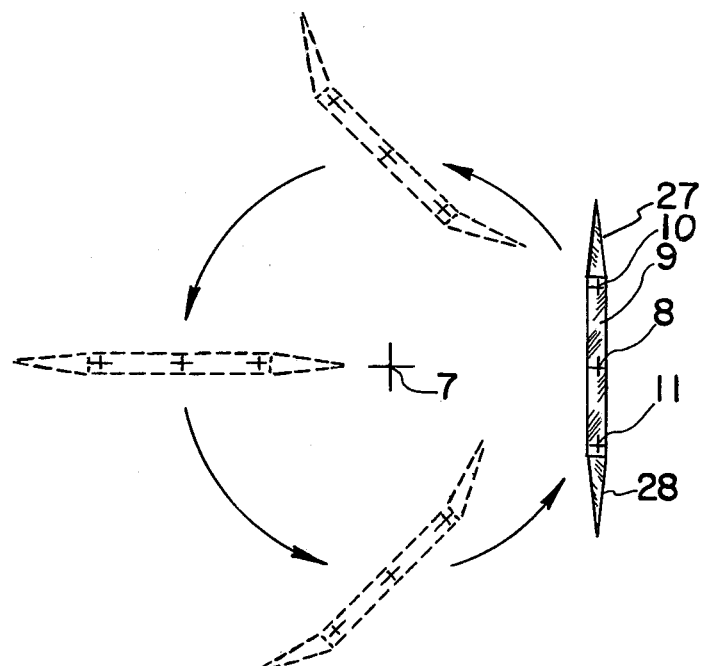
FIG. 5 illustrates a plan view of another arrangement of the blade-flap assembly showing its orientation and camber at various positions of the revolution of the blade about the central axis of the fluid power machine.
Figure 6:
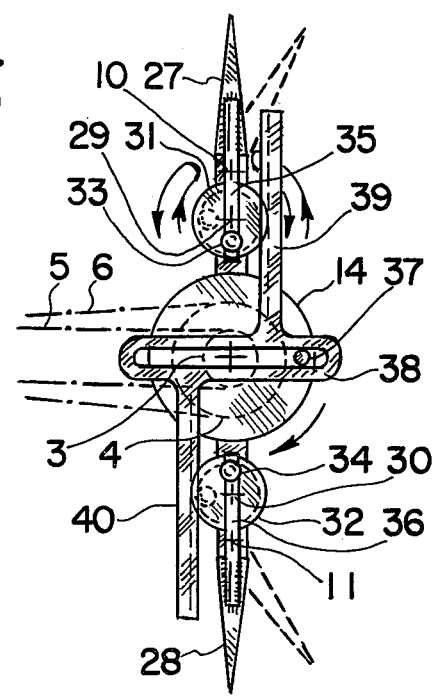
FIG. 6 illustrates a mechanism for linking the pivoting motion of the flaps to the rotating motion of the blade that results in the arrangement shown in FIG. 5.

In FIGS. 5 and 6, there are illustrated another embodiment for a blade assembly including a pair of flaps 27 and 28 connected to each of the edges of the blade 9 pivotably about the flap axis 10 and 11, respectively. In this embodiment, a crank pin 37 is eccentrically disposed on the face of the wheel or sprocket or gear 14 rigidly and coaxially connected to the flap sprocket or gear 3, which pin engages a slotted lever 38 including a pair of racks 39 and 40. The racks 39 and 40 drives the actuator gear or sprockets 31 and 32, respectively, in a rack and pinion relationship, wherein the pair of the actuator gears or sprockets 31 and 32 are sized in such a way that these actuator gears or sprockets undergo an alternating cyclic rotation of 360 degree per 360 degree revolution of the blade 9 about the central shaft 18, as indicated by arrow marks shown in FIG. 6. The pattern of the resulting flap motion is shown in FIG. 5 wherein the maximum deflection of the flap takes place at revolution angles approximately equal to 90 and 270 degree. It should be understood that the actual angles at which the maximum deflection of the flaps and the maximum camber of the blade takes place can be equal to or somewhat greater or somewhat less than 90 and 270 degree revolution angles depending on the distance from the flap axis to the center of the actuator gear or sprockets in comparison with the eccentric dimension of the slide bearings. It is obvious that there are many different mechanical transmission means as well as many different hydraulic means those can be used to obtain the linkage between the movements of the flaps, blade and the revolution of the fluid power machine, which linkage results in the pattern of the motion as shown in FIG. 3 or 5, which is the end object of the principles taught by the present invention.

While the principles of the invention have now been made clear in an illustrative embodiment there will be immediately obvious to those skilled in the art many modifications of structure, arrangements, proportions, the elements, materials and components used in the practice of the invention which are particularly adapted for specific environments and operating requirements without departing from these principles.

I claim:

1. Another variable camber fluid power machine comprising in combination:
    (a) a central shaft;
    (b) a plurality of arms extending axisymmetrically from said central shaft, said plurality of arms rotatable about said central shaft;
    (c) a plurality of blades, each of which plurality of blades disposed near the outer extremity of each of said plurality of arms rotatably about an axis generally parallel to said central shaft;
    (d) mechanical or hydraulic means linking the rotational motion of said plurality of blades about the blade axis to the revolving motion of said plurality of blades about said central shaft wherein each of said plurality of blades undergoes 180 degree rotation per 360 degree revolution by each of said plurality of blades about and relative to said central shaft;
    (e) a plurality of pairs of flaps, each of said pairs of flaps pivotably disposed to each edge of each of said plurality of blades wherein said each of said pairs of flaps is pivotable about an axis generally parallel to said central shaft; and
    (f) mechanical or hydraulic means linking the deflection of said pairs of flaps to the revolving motion of said plurality of blades about and relative to said central shaft wherein the maximum camber generating higher lift force takes place at angles of revolution equal to or somewhat greater than or somewhat less than 90 and 270 degrees, said angle of revolution measured from the minimum drag position of revolution.

2. The combination as set forth in claim 1 wherein a means for detecting and aligning the angular position of said central shaft with respect to the direction of the fluid stream is included, said means automatically aligning and maintaining the diametrical plane including the maximum and minimum drag positions of the revolution at a position generally perpendicular to the direction of the fluid stream.

3. The combination as set forth in claim 2 wherein one or more rudder rigidly afixed to said central shaft comprises said means for detecting and aligning the angular position of said central shaft.

4. The combination as set forth in claim 2 wherein a combination of a fluid stream direction sensor and a servomotor rotating said central shaft comprises said means for detecting and aligning the angular position of said central shaft.

* * * * *